United States Patent
Brückner

(10) Patent No.: US 11,834,000 B2
(45) Date of Patent: Dec. 5, 2023

(54) METHOD FOR OPERATING A LOCKING SYSTEM OF A VEHICLE HAVING SEPARATE INTERIOR SENSING AND EXTERIOR SENSING OF A KEY DEVICE, AND LOCKING SYSTEM

(71) Applicant: VOLKSWAGEN AKTIENGESELLSCHAFT, Wolfsburg (DE)

(72) Inventor: Claus-Peter Brückner, Braunschweig (DE)

(73) Assignee: Volkswagen Aktiengesellschaft

( * ) Notice: Subject to any disclaimer, the term of this patent is extended or adjusted under 35 U.S.C. 154(b) by 339 days.

(21) Appl. No.: 17/433,690

(22) PCT Filed: Feb. 4, 2020

(86) PCT No.: PCT/EP2020/052694
§ 371 (c)(1),
(2) Date: Aug. 25, 2021

(87) PCT Pub. No.: WO2020/177962
PCT Pub. Date: Sep. 10, 2020

(65) Prior Publication Data
US 2022/0153229 A1     May 19, 2022

(30) Foreign Application Priority Data

Mar. 6, 2019  (DE) .................... 10 2019 203 029.7

(51) Int. Cl.
*B60R 25/24*     (2013.01)
*B60R 25/01*     (2013.01)
(Continued)

(52) U.S. Cl.
CPC .............. *B60R 25/24* (2013.01); *B60R 25/01* (2013.01); *E05B 81/56* (2013.01); *E05B 81/78* (2013.01); *E05B 83/36* (2013.01)

(58) Field of Classification Search
CPC ......... B60R 25/24; B60R 25/01; E05B 81/56; E05B 81/78; E05B 83/36
See application file for complete search history.

(56) References Cited

U.S. PATENT DOCUMENTS 6,208,239 B1 *   3/2001   Muller ............... G07C 9/00309
                                                          340/5.2
6,937,137 B1     8/2005   Giehler et al.
(Continued)

FOREIGN PATENT DOCUMENTS

CN      107561567 A      1/2018
DE      10045762 A1      4/2002
(Continued)

OTHER PUBLICATIONS

Office Action; Chinese Patent Application No. 2020800189252; dated Dec. 5, 2022.
(Continued)

*Primary Examiner* — Ramsey Refai
(74) *Attorney, Agent, or Firm* — BARNES & THORNBURG, LLP

(57) ABSTRACT

A method for operating a locking system of a transportation vehicle in which time-of-flight measurements are made using at least one interior transceiver situated in an interior of the transportation vehicle, and using at least one exterior transceiver situated outside the interior; the time-of-flight measurements are used to determine a position of a key
(Continued)

device relative to the transportation vehicle; and an operating function of the locking system is performed based on the relative position determined.

17 Claims, 1 Drawing Sheet

(51) Int. Cl.
*E05B 81/56* (2014.01)
*E05B 81/78* (2014.01)
*E05B 83/36* (2014.01)

(56) References Cited

U.S. PATENT DOCUMENTS

| | | | |
|---|---|---|---|
| 7,579,938 B2 | 8/2009 | Teshima et al. | |
| 9,924,318 B2 | 3/2018 | Ghabra et al. | |
| 9,925,955 B2 | 3/2018 | Watanabe | |
| 11,217,047 B2 | 1/2022 | Plattner et al. | |
| 2002/0067250 A1* | 6/2002 | Kamlah | B60R 25/00 340/901 |
| 2003/0193388 A1 | 10/2003 | Ghabra et al. | |
| 2005/0024181 A1 | 2/2005 | Hofbeck et al. | |
| 2014/0330449 A1* | 11/2014 | Oman | B60R 25/245 701/2 |
| 2017/0026910 A1 | 1/2017 | Scheim et al. | |
| 2018/0208155 A1* | 7/2018 | Beyer | B60R 25/245 |
| 2018/0234797 A1 | 8/2018 | Ledvina et al. | |
| 2019/0355196 A1 | 11/2019 | Plattner et al. | |

FOREIGN PATENT DOCUMENTS

| | | |
|---|---|---|
| DE | 10235361 A1 | 10/2003 |
| DE | 10334625 A1 | 3/2005 |
| DE | 102007020802 A1 | 12/2007 |
| EP | 0983916 A1 | 3/2000 |
| JP | 2003201784 A | 7/2003 |
| JP | 2006104859 A | 4/2006 |
| JP | 2008309555 A | 12/2008 |
| JP | 2013177132 A | 9/2013 |
| JP | 2016013680 A1 | 6/2017 |
| JP | 2019014309 A | 1/2019 |
| WO | 2008135216 A1 | 11/2008 |
| WO | 2018137923 A1 | 8/2018 |

OTHER PUBLICATIONS

Office Action; Japanese Patent Application No. 2021-552680; dated Dec. 16, 2022.
Office Action; Korean Patent Application No. 10-2021-7031117; dated Jun. 14, 2023.
Office Action; Japanese Patent Application No. 2021-552680; dated Aug. 16, 2022.
Search Report for International Patent Application No. PCT/EP2020/052694; dated May 6, 2020.

* cited by examiner

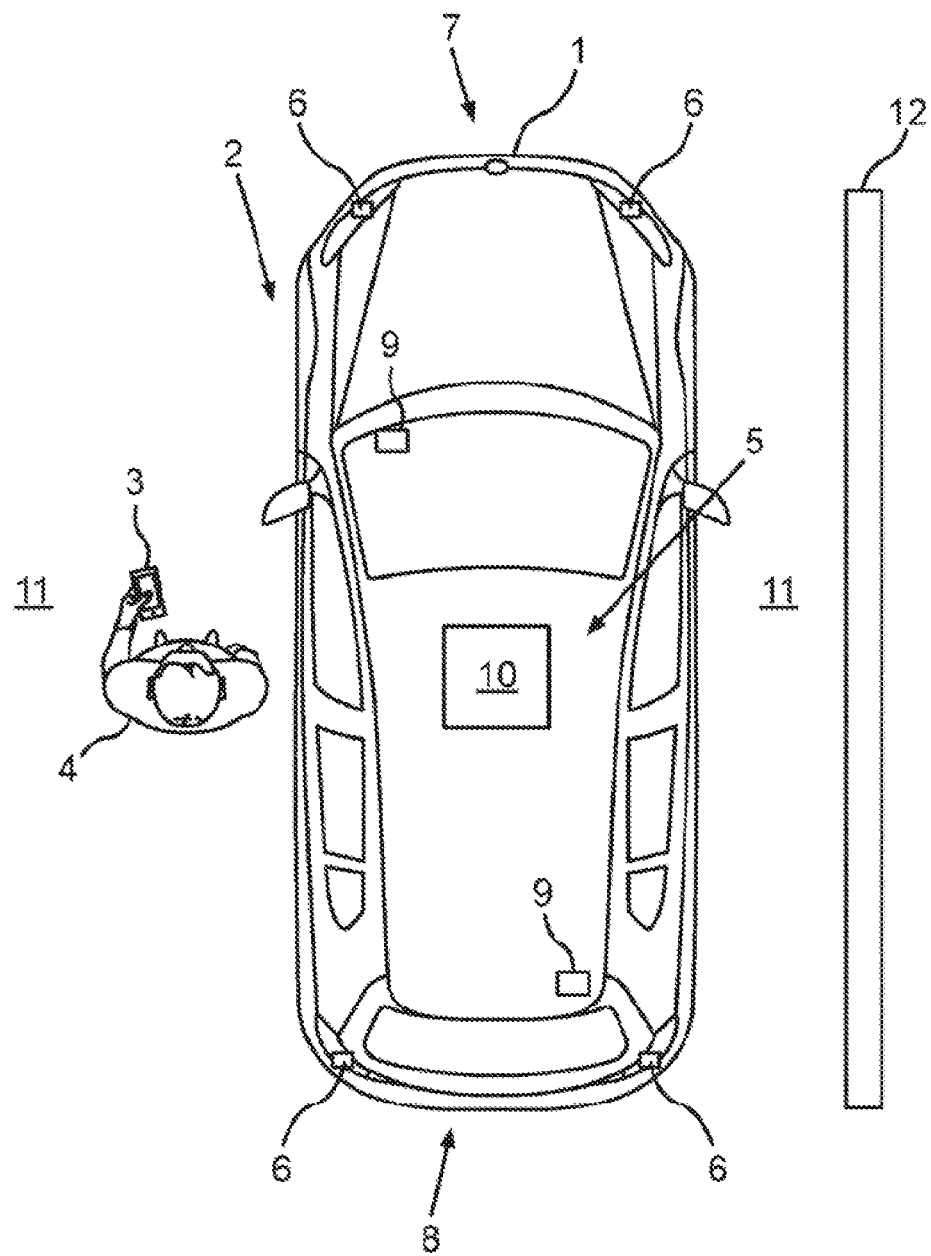

METHOD FOR OPERATING A LOCKING SYSTEM OF A VEHICLE HAVING SEPARATE INTERIOR SENSING AND EXTERIOR SENSING OF A KEY DEVICE, AND LOCKING SYSTEM

PRIORITY CLAIM

This patent application is a U.S. National Phase of International Patent Application No. PCT/EP2020/052694, filed 4 Feb. 2020, which claims priority to German Patent Application No. 10 2019 203 029.7, filed 6 Mar. 2019, the disclosures of which are incorporated herein by reference in their entireties.

SUMMARY

Illustrative embodiments relate to a method for operating a locking system of a transportation vehicle in which time-of-flight measurements are carried out in each case using at least one interior transceiver which is situated in an interior of the transportation vehicle, and using at least one exterior transceiver which is situated outside the interior of the transportation vehicle, a position of a key device relative to the transportation vehicle is determined on the basis of the time-of-flight measurements, and an operating function of the locking system is performed based on the determined position of the key device relative to the transportation vehicle, wherein the operating function is a locking of the transportation vehicle, an unlocking of the transportation vehicle and/or a starting of a drive motor of the transportation vehicle. Illustrative embodiments further relate to a locking system and a transportation vehicle.

BRIEF DESCRIPTION OF THE DRAWINGS

The disclosed embodiments will be described in more detail below with reference to the single drawing, in which:

FIG. 1 shows a top view of a transportation vehicle.

DETAILED DESCRIPTION

Locking systems for transportation vehicles are known from the prior art. These locking systems comprise a key device which can be designed, for example, as a radio key or as a mobile device. The transportation vehicle or the doors of the transportation vehicle can be locked or unlocked with the locking system of the transportation vehicle. The locking system also serves to start a drive motor of the transportation vehicle. Locking systems which can locate the key device are further known from the prior art. Exterior transceivers are installed in the exterior area of the transportation vehicle to locate the key device. Further interior transceivers are further installed in the interior of the transportation vehicle to be able to locate the key device in the interior. Times of flight are measured in each case between the key device and all transceivers installed in the transportation vehicle. The position of the key device or the relative position between the key device and the transportation vehicle can be determined from the respective times of flight.

It is assumed during the locating operation that the respective times of flight describe the distance or the shortest route between the key device and the transceiver. In certain positions of the key device in the interior of the transportation vehicle, no direct radio measurement path exists between the key device and the transceivers, since, for example, in the case of the exterior transceivers, the radio signal is interrupted by the bodywork of the transportation vehicle and, in the case of the interior transceivers, the radio signal is interrupted by seat backrests or persons in the transportation vehicle. This can result in reflections of the signal. In this case, incorrect distance measured values can be calculated if, depending on the surrounding area of the transportation vehicle, signals reflected by objects with longer signal times of flight are used.

According to the prior art, the times of flight of all interior transceivers and all exterior transceivers are incorporated into the evaluation method or into a corresponding optimization algorithm to locate the key device to be able to locate the key device as precisely as possible. However, tests have revealed that, in reflecting transportation vehicle surrounding areas, for example, in confined parking lots or garages, in the case of the locating operation in the interior, incorrect distance measured values of the exterior transceivers can cause the result of the locating operation to describe the key device as being present outside the transportation vehicle, even though the key device is really present in the interior of the transportation vehicle. In the case of a passive entry system, this can produce the result that the key device or the transportation vehicle key is locked in the interior of the transportation vehicle in an unwanted manner, or the transportation vehicle cannot be started.

Disclosed embodiments provide a solution by which a location of a key device can be improved and therefore an operation of a locking system can be carried out more reliably.

This is achieved by a method, by a locking system and by a transportation vehicle.

A disclosed method serves to operate a locking system of a transportation vehicle. In the method, time-of-flight measurements are carried out in each case with at least one interior transceiver which is arranged in an interior of the transportation vehicle, and with at least one exterior transceiver which is arranged outside the interior of the transportation vehicle. A position of the key device relative to the transportation vehicle is determined on the basis of the time-of-flight measurements. An operating function of the locking system is further determined depending on the determined position of the key device relative to the transportation vehicle, wherein the operating function is a locking of the transportation vehicle, an unlocking of the transportation vehicle and/or a starting of a drive motor of the transportation vehicle. It is provided here that an interior locating operation in which the position of the key device relative to the transportation vehicle is determined only on the basis of the time-of-flight measurement with the at least one interior transceiver and an exterior locating operation in which the relative position is determined only on the basis of the time-of-flight measurement with the at least one exterior transceiver being carried out separately. Furthermore, the relative position determined during the interior location operation and/or the exterior location operation is selected depending on the operating function.

The locking system of the transportation vehicle is intended to be operated using the method. This locking system serves to lock and unlock the doors and/or the trunk of the transportation vehicle. The locking system further serves to start and/or stop a drive motor of the transportation vehicle. The locking system comprises the key device which can be designed as a radio key. It can also be provided that the key device is provided by a mobile device, for example, a smartphone or the like. The key device can be carried by the user or driver of the transportation vehicle. The key device can further have or provide corresponding operating elements. Operating functions of the locking system, in particular, the locking and unlocking, can be requested through an actuation of these operating elements.

The locking system further comprises the at least one interior transceiver which is arranged in the interior of the transportation vehicle. The term "interior" is understood here to mean the passenger compartment and also a trunk or stowage space of the transportation vehicle. A plurality of interior transceivers can also be arranged in the interior of the transportation vehicle. The exterior transceivers can be arranged outside the interior. The exterior transceivers can be arranged, for example, on an outer shell of the transportation vehicle. The exterior transceivers can be arranged on the bodywork and/or on an external component. The exterior transceivers can be arranged on or concealed behind the bumpers of the transportation vehicle. Here also, it may be provided that the locking system has a plurality of exterior transceivers. These exterior transceivers can be arranged, for example, on the respective outer corners of the transportation vehicle.

A signal can be exchanged wirelessly or via a radio link between the respective transceivers, i.e., the interior transceivers and exterior transceivers, and the key device. The transceivers can also be referred to as radio measurement transceivers. The respective time of flight for the transmission of the signal between the key device and the transceiver is determined. Ultra-broadband technology, for example, can be used for the transmission of the signal. The distance between the key device and the respective transceivers can then be deduced on the basis of the known propagation speed of the signal. The respective times of flight or distances can be determined with a control unit or a computing device of the locking system. The relative position between the key device and the transportation vehicle or a reference point of the transportation vehicle can then be determined on the basis of the respective distances and the known installation positions of the transceivers. The performance of the respective operating functions of the locking system is determined depending on the relative position between the key device and the transportation vehicle. It may be the case that an operating function of the locking system is requested. This can be performed by a corresponding operating input of the user or driver. This operating input can be performed on an operating element of the key device or an operating element in the interior of the transportation vehicle. It can also be provided that the operating function is requested automatically. Following the request for the operating function, a verification can be carried out by the control unit to determine whether this operating function can be performed depending on the relative position between the key device and the transportation vehicle. The locking of the doors, for example, can be carried out only if the key device is present outside the transportation vehicle. If further key devices are simultaneously present in the transportation vehicle, it is necessary to deactivate them. The starting of the drive motor can further be performed only if the key is present in the interior of the transportation vehicle.

According to at least one disclosed embodiment, it is provided that an interior location operation and an exterior location operation are carried out separately to locate the key device. In the case of the interior location operation, only the time-of-flight measurements of the interior transceivers are used to determine the relative position between the transportation vehicle and the key device. In the case of the exterior location operation, only the time-of-flight measurements of the exterior transceivers are used to determine the relative position between the transportation vehicle and the key device. In one measurement cycle, the relative position is therefore determined, on the one hand, with the interior transceivers, and, on the other hand, the relative position is determined independently therefrom with the exterior transceivers. In contrast to the prior art, it is therefore not provided that the time-of-flight measurements of all available transceivers are used simultaneously to determine the relative position. Depending on the requested operating function, it is then decided whether the data from the interior location operation and/or the data from the exterior location operation are used to determine the relative position. The selection of the data from the interior location operation and/or the data from the exterior location operation for the respective operating functions, i.e., the locking, the unlocking, the starting of the motor and the stopping of the motor, can be stored in an assignment rule set or table. It can also be provided that the results of the interior location operation and/or the exterior location operation are evaluated differently depending on the operating function.

It is provided that the location of the key device is performed continuously with all transceivers. The evaluation is performed not only if the operating function has been requested. The respective time-of-flight measurements with the transceivers can be carried out in parallel or quasi-parallel and can be evaluated accordingly. The evaluations may therefore be performed in parallel for the different operating functions. The results of the location operation can thus be retained and can be used immediately to decide whether the performance of the requested operating function is allowed. It is provided that only the necessary transceivers are incorporated into the evaluation.

The present disclosure is based on the realization that measurement errors can occur in certain transceivers depending on the position of the key device. It may be the case, for example, that measurement errors occur in the exterior transceivers as a result of reflections if the key device is present in the interior of the transportation vehicle. Depending on the requested operating function, it is necessary to reliably recognize the position of the key device in the interior or outside the transportation vehicle. The transceivers with which the position of the key device can be most reliably recognized for the operating function are taken into account here. Predetermined evaluation algorithms with which the relative position can be determined can be executed on the basis of the interior location operation and the exterior location operation. Different evaluation methods can therefore be carried out depending on the location area (interior or outside the transportation vehicle). On the whole, this enables an improved location of the key device and therefore a more reliable operation of the locking system.

In one embodiment, the locking is carried out only depending on the relative position determined during the interior location operation if the operating function is the locking of the transportation vehicle. The locking of the transportation vehicle is allowed to take place only if it can be ensured that the key device is not present in the interior of the transportation vehicle. In this case, only the interior transceivers can be used for the distance measurement. The key device is searched for here in a targeted manner in the interior of the transportation vehicle to prevent a lock-in of the key device in the interior of the transportation vehicle. In this case, the external location operation is not used, since measurement errors can occur in the exterior transceivers due to reflections. Thus, for example, erroneous recognition of the position of the key device as being outside the transportation vehicle can be prevented. This may be the case, for example, if the key device is present in a jacket pocket of a jacket and the jacket is laid down by the user or driver in the interior of the transportation vehicle before the transportation vehicle is locked.

In a further embodiment, the unlocking is carried out only depending on the relative position determined during the exterior location operation if the operating function is the unlocking of the transportation vehicle. Generally speaking, if the position of the key device is intended to be determined outside the transportation vehicle, only the data from the exterior location operation are used. If the key device is present outside the transportation vehicle, measurement errors can occur in the interior transceivers. These measurement errors can be caused by reflections and/or interruptions of the signals of the interior transceivers. The position of the key device can therefore be precisely determined outside the transportation vehicle.

In a further embodiment, the relative position determined during the interior location operation can be verified by the relative position determined during the exterior location operation if the operating function is the starting of the drive motor of the transportation vehicle. If the drive motor of the transportation vehicle is intended to be started or the start of the drive motor is intended to be enabled, it is necessary, and also prescribed by law, that the driver or user must be present with the key device in the interior of the transportation vehicle. Since a verification is carried here out to determine whether the key device is present in the transportation vehicle, only the data from the interior location operation are initially used. It is furthermore possible to verify or confirm on the basis of the exterior location operation or the measurements of the exterior transceivers that the key device is actually present in the interior. This can be carried out in parallel with the interior monitoring or can be verified in an additional evaluation algorithm. Security can be guaranteed and the legal requirements can be met by this two-stage verification. A situation, for example, in which the drive motor is inadvertently started can thus be excluded. This may be the case, for example, if the user or driver is present outside the transportation vehicle but close to the transportation vehicle and his child actuates the start button in the transportation vehicle. If the position or relative position of the key device is incorrectly recognized here as being in the interior of the transportation vehicle, this could, in the worst case, result in the motor being started and the transportation vehicle moving.

Respective evaluation algorithms with which the time-of-flight measurements of the respective transceivers are evaluated can be provided for different operating functions. As explained above, only the interior location operation can be used during the locking operating function. In this case, only the time-of-flight measurements of the interior transceivers can be used. Here, it is provided that only the interior of the transportation vehicle is monitored with the interior transceivers. In the case of the motor start operating function, it can further be provided that the interior of the transportation vehicle is similarly monitored here for the presence of the key device. It can further be provided in the case of this operating function that the time-of-flight measurements of the exterior transceivers are used to monitor the interior of the transportation vehicle. It can further be provided in the case of the motor start operating function that a predetermined area outside the transportation vehicle or around the transportation vehicle is monitored. The area can extend from the transportation vehicle for a predetermined distance, for example, 20 cm, to the outer shell of the transportation vehicle. If the key device is recognized in the interior or in this area, the start of the drive motor can be enabled.

It is further beneficial if the time-of-flight measurements carried out during the interior location operation and/or the time-of-flight measurements carried out during the exterior location operation are validated. In other words, a validation can be carried out during both the interior location operation and the exterior location operation. The individual distance measured values of the transceivers can be validated before they are incorporated into the evaluation algorithm or are rejected. The validation can, for example, first be carried out and the evaluation algorithm or location algorithm can then be executed only on the basis of the validated values. The evaluation algorithm can also be based on artificial intelligence. A validation of the time-of-flight measurement or distance measurement can be carried out here for the respective transceivers. The known installation positions of the transceivers can be used for this purpose. The known distances between the transceivers installed on the transportation vehicle can be used for the validation. If the key device is detected, for example, with two transceivers, a verification can be carried out to determine whether the sum of the distances respectively determined with the transceivers is greater than a limit value which is determined on the basis of the distance between the transceivers. If the key device was present between the transceivers and the sum of the measured distances is greater than the limit value, the results of the measurement can be classified as incorrect. A further verification can be carried out to determine whether the results which describe the position or the relative position differ from one another. It can further be provided that triangulation calculations are used for the validation. In particular, triangulation can be used if the key device is detected with at least two transceivers, in particular, two exterior transceivers. On the whole, the determination of the position of the key device can thus be reliably performed.

A verification is carried out during the validation to determine whether a signal from the at least one interior transceiver and/or the at least one exterior transceiver has been reflected during the time-of-flight measurement. As already explained, the installation positions of the respective interior transceivers and the exterior transceivers are known. A verification can be carried out on the basis of the known installation positions or the distances of the respective transceivers from one another and depending on geometric relationships to determine whether the signal has possibly been reflected. If the signal has been reflected, significantly longer signal times of flight will occur, but are not valid. The location of the key device can be carried out reliably by the validation of the measurement results.

It is further beneficial if a prioritization of the relative position determined during the interior location operation and/or the exterior location operation is carried out depending on the operating function. The results of the interior location operation and/or the exterior location operation can be weighted accordingly in the prioritization. A weighting can thus be applied to the measurement results determined during the interior location operation and/or during the exterior location operation. If, for example, the locking of the transportation vehicle or the doors of the transportation vehicle is intended to be carried out as the operating function, the result that the key device is present in the interior can be prioritized or more heavily weighted. It can thus be achieved that the transportation vehicle is locked accordingly and convenience for the driver or user is therefore increased. However, if the drive motor is intended to be started as the operating function, the presence of the key device outside the transportation vehicle can be prioritized.

It can thus be guaranteed, even in the event of conflicting measurement results, that the drive motor is not inadvertently started.

In a further design, the interior location operation and the exterior location operation are carried out continuously and the relative position respectively determined herein is stored. In other words, the history of the position or the relative position of the key device can be tracked. Thus, in a manner of speaking, a trajectory describing the movement of the key device depending on time can be determined. It is thus also possible to recognize if the key device is moved from the exterior area into the interior of the transportation vehicle. It is similarly possible to recognize if the key device is moved from the interior to the exterior. It can also be provided that a corresponding transitional region is defined in the interior of the transportation vehicle and the exterior area or the surrounding area. Both the results of the interior location operation and the results of the exterior location operation, for example, can be used in this defined transitional region. This can be carried out until a stable evaluation is achieved, indicating either that the key is present in the interior of the transportation vehicle or that the key is present outside the transportation vehicle. The location of the key device can also be improved as a result.

According to a further design, the interior location operation and the exterior location operation are carried out in parallel. If the interior location operation and the exterior location operation are carried out in parallel, time delays in the location of the key device can be avoided. It is provided here that the control unit or the computing device has a multicore processor. One core can thus be used, for example, for the exterior location operation and another core can be used for the interior location operation. The evaluation methods or evaluation algorithms can then be calculated independently from one another with the respective processor cores. The location of the key device can thus be carried out within a short computing time.

According to a further embodiment, is characterized on the basis of a measurement with the at least one exterior transceiver and on the basis of reference measurements of a surrounding area of the transportation vehicle. It is provided that a plurality of exterior transceivers are used for this measurement. Signals can be transmitted with the respective exterior transceivers and/or the signals reflected in the surrounding area of the transportation vehicle can in turn be received. It is further provided that the respectively transmitted signals contain information describing the exterior transceiver from which the signal has been transmitted. It can thus be determined, for example, whether the signals are reflected in the surrounding area of the transportation vehicle. These measurements are carried out purely on the basis of the exterior transceivers and the key device or the position of the key device is not sensed in this case. Previously carried out reference measurements can further be used to characterize the surrounding area of the transportation vehicle. The reference measurements can be carried out, for example, in reference surrounding area situations. Reference surrounding area situations of this type can describe, for example, a garage, a parking lot or an open space in the surrounding area of the transportation vehicle. The surrounding area of the transportation vehicle can be characterized by a comparison of the measurements with the previously determined reference measurements. This characterization of the surrounding area can be used to evaluate the measurement results accordingly. The characterization can further be used to use either only the results of the exterior location operation or only the results of the interior location operation. The results of the characterization of the surrounding area can be incorporated into the evaluation or the evaluation algorithms and also into the previously described validation.

A disclosed locking system for a transportation vehicle comprises a control unit, at least one interior transceiver, at least one exterior transceiver and a key device. The locking system is designed to carry out a disclosed method and the designs thereof. It is provided that the locking system has a plurality of interior transceivers and a plurality of exterior transceivers.

An exemplary transportation vehicle comprises a disclosed locking system. The transportation vehicle can be designed as a passenger vehicle. It can also be provided that the transportation vehicle is designed as a utility vehicle.

A disclosed computer program product comprises commands which, when the program is executed by a control unit, cause the control unit to carry out the disclosed method and the designs thereof. An exemplary computer-readable storage medium comprises commands which, when executed by a control unit, cause the control unit to carry out the disclosed method and the designs thereof.

The embodiments proposed with reference to the disclosed method and their benefits apply accordingly to the disclosed locking system, to the disclosed transportation vehicle, to the disclosed computer program product and to the disclosed computer-readable storage medium.

The features and feature combinations specified above in the description, and also the features and feature combinations specified below in the description of the FIGURE and/or shown in the FIGURE alone are usable not only in the respectively indicated combination but also in other combinations without departing the scope of the disclosure. The disclosed embodiments will now be explained in detail on the basis of an example embodiment and with reference to the attached drawing. The single FIGURE shows a schematic view of a transportation vehicle which has a locking system.

The single FIGURE shows a transportation vehicle 1 in a top view, the transportation vehicle being designed here as a passenger transportation vehicle. This transportation vehicle 1 comprises a locking system 2. The locking system 2 serves to lock and unlock the transportation vehicle 1. In addition, the locking system 2 serves to start and, if necessary, stop a drive motor of the transportation vehicle 1. The locking system 2 comprises a key device 3 which can be carried by a user 4 or driver of the transportation vehicle 1. This key device 3 can be designed as a radio key. In the present example embodiment, the key device 3 is designed as a mobile device or as a smartphone. Corresponding operating elements which can be actuated by the user 4 are provided with the key device 3. A command, for example, to lock and/or unlock the transportation vehicle 1 can thus be transmitted to the locking system 2. It can also be provided that a command to enable the start of the drive motor or to deactivate the transportation vehicle immobilizer can be output by the key device 3. Alternatively, a corresponding operating element can be provided in an interior 5 of the transportation vehicle 1.

It is further provided that a current position of the key device 3 or a relative position between the key device 3 and the transportation vehicle 1 is determined continuously. The locking system 2 comprises at least one exterior transceiver 6 for this purpose. In the present example embodiment, the locking system 2 comprises four exterior transceivers 6, wherein the exterior transceivers 6 are arranged outside the interior 5 of the transportation vehicle 1. In the present example embodiment, two exterior transceivers 6 are arranged in a front area 7 and two exterior transceivers 6 are arranged in a rear area 8 of the transportation vehicle 1. The exterior transceivers 6 are arranged on the respective outer corners of the transportation vehicle 1 on or behind the bumpers. In addition, the locking system 2 comprises at least one interior transceiver 9. In the present example embodiment, the locking system 2 comprises two interior transceivers 9 which are arranged in the interior 5 of the transportation vehicle. The respective transceivers 6, 9 are connected to the key device 3 for wireless data transmission. This means that radio signals can be exchanged between the respective transceivers 6, 9 and the key device 3. The distance between the respective transceivers 6, 9 and the key device 3 can be determined on the basis of the time of flight of the respective radio signals.

The relative position between the key device 3 and the transportation vehicle 1 or a reference point of the transportation vehicle 1 can then be determined on the basis of the respective distances. The relative position between the key device 3 and the transportation vehicle 1 can be determined by a control unit 10 of the transportation vehicle 1. The transceivers 6, 9 are connected to the control unit 10 for data transmission. Corresponding data lines or a data bus are not shown here in the interests of clarity. Corresponding control commands can be transmitted with the control unit 10 to lock or unlock the doors of the transportation vehicle 1. Control commands can further be transmitted to start the drive motor or to enable the start. As already explained, operating functions of the locking system 2 can be requested by a corresponding operating input of the user 4. These operating functions can be the locking of the transportation vehicle 1, the unlocking of the transportation vehicle 1, the starting of the drive motor and/or the stopping of the drive motor. By using the locking system 2 or the control unit 10, it can now be decided, depending on the current position of the key device 3, whether this operating function is performed. The locking of the transportation vehicle 1, for example, is carried out only if the key device 3 is present outside the interior 5 of the transportation vehicle 1. The starting of the drive motor is carried out only if the key device 3 is present in the interior 5 of the transportation vehicle 1.

A corresponding evaluation algorithm is executed by the control unit 10 on the basis of the respectively determined times of flight or distances. It can then be determined with this evaluation algorithm whether the key device 3 is present in the interior 5 or outside the interior 5. According to the prior art, it is provided that the results of all transceivers 6, 9 are used for this purpose. If reflecting objects are present in a surrounding area 11 of the transportation vehicle 1, this can result in measurement errors. In the present example embodiment, a wall 12 is shown schematically which is present in the surrounding area 11 of the transportation vehicle 1. The signals from the exterior transceivers 6, for example, can be reflected on this wall 12, so that the measurement result is corrupted. Is thus not possible to determine reliably whether the key device 3 is present in the interior 5 or outside the transportation vehicle 1.

To improve the location of the key device 3, it is provided that an interior location operation and an exterior location operation are carried out separately. In the case of the interior location operation, only the time-of-flight measurements of the interior transceivers 9 are used. In the case of the exterior location operation, only the measurement results or time-of-flight measurements of the exterior transceivers 6 are used. It is further provided that, depending on the requested operating function, it is decided whether the results of the interior location operation and/or the exterior location operation are used to determine the position of the key device 3. Furthermore, depending on the operating function, one or more evaluation algorithms can be selected to evaluate the time-of-flight measurements.

If, for example, the locking of the transportation vehicle 1 is requested as the operating command, only the results of the interior location operation are used. It is possible here to identify reliably with the interior transceivers 9 whether the key device 3 is present in the interior 5. In this case, the results of the exterior transceivers 6 which may be influenced by reflecting objects are not taken into account. The presence of the key device 3 in the interior 5, for example, can thus be reliably excluded. If this can be ensured, the locking of the transportation vehicle 1 can be carried out. If the position of the key device 3 is identified as being outside the transportation vehicle 1, only the results of the exterior location operation, for example, can be used.

If the start of the drive motor or the enablement for the motor start is requested as the operating function, results of the interior location operation can initially be used to verify that the key device 3 is present in the interior 5 of the transportation vehicle 1. In parallel thereto, a verification can be carried out on the basis of the exterior location operation. It is possible to verify here that the key device 3 is not present outside the transportation vehicle 1. Only then can the starting of the drive motor be carried out. When the motor start is requested, it can also be provided that both the measurements of the interior transceivers 9 and the measurements of the exterior transceivers are used It can further be provided that the results of the interior location and/or the exterior location are validated accordingly. The known installation positions or the distances of the respective transceivers 6, 9 from one another can be taken into account for this purpose. Triangulation methods can further be used to validate the measurement results. It can further be provided that the current position of the key device is determined continuously and the position is stored. A history of the position of the key device can thus be tracked and the evaluation method can be switched from interior location to exterior location or from exterior location to interior location if the key device 3 leaves the transportation vehicle 1 or is moved from outside into the transportation vehicle 1. Both the interior location operation and the exterior location operation can be used in a transitional region between the interior 5 and the surrounding area 11.

On the whole, the negative influences of the reflecting signals can thus be eliminated and the location of the key device 3 can be carried out more reliably.

REFERENCE NUMBER LIST

1 Transportation vehicle
2 Locking system
3 Key device
4 User
5 Interior
6 Exterior transceiver
7 Front area
8 Rear area
9 Interior transceiver
10 Control unit
11 Surrounding area
12 Wall

The invention claimed is:

1. A method for operating a locking system of a transportation vehicle, wherein time-of-flight measurements are carried out using at least one interior transceiver arranged in an interior of the transportation vehicle and at least one exterior transceiver arranged outside the interior, the method comprising:
   determining a position of a key device relative to the transportation vehicle based on the time-of-flight measurements, wherein the determining of the key device position is performed in an interior locating operation in which the position of the key device relative to the transportation vehicle is determined based only on the time-of-flight measurement with the at least one interior transceiver, wherein the determining of the key position relative to the transportation vehicle is performed in an exterior locating operation in which the relative position is determined based only on the time-of-flight measurement with the at least one exterior transceiver, and wherein the interior locating operation and the exterior locating operation are carried out separately;
   performing an operating function of the locking system based on the determined position of the key device relative to the transportation vehicle, wherein the relative position determined during the interior location operation and/or the exterior location operation is selected as the basis for performing the locking system operating function to be performed, wherein the locking system operating function is a locking of the transportation vehicle, an unlocking of the transportation vehicle and/or a starting of a drive motor of the transportation vehicle; and
   validating the time-of-flight measurements carried out during the interior location operation and/or the time-of-flight measurements carried out during the exterior location operation, wherein a verification is performed during the validation to determine whether a signal from the at least one interior transceiver and/or the at least one exterior transceiver has been is reflected during the time-of-flight measurement.

2. The method of claim 1, wherein, in response to the operating function being the locking of the transportation vehicle, the locking is performed based only on the relative position determined during the interior location operation.

3. The method of claim 1 wherein, in response to the operating function being the unlocking of the transportation vehicle, the unlocking is performed based only on the relative position determined during the exterior location operation.

4. The method of claim 1, wherein, in response to the operating function being the starting of the drive motor of the transportation vehicle, the relative position determined during the interior location operation is verified by the relative position determined during the exterior location operation.

5. The method of claim 1, wherein a prioritization of the relative position determined during the interior location operation and/or the exterior location operation is performed based on the locking system operating function to be performed.

6. The method of claim 1, wherein the interior location operation and the exterior location operation are performed continuously and the method further comprises storing the determined relative positions.

7. The method of claim 1, wherein the interior location operation and the exterior location operation are performed in parallel.

8. The method of claim 1, further comprising categorizing a surrounding area of the transportation vehicle based on reference measurements and a measurement using the at least one exterior transceiver.

9. A locking system for a transportation vehicle, the locking system comprising:
   a control unit;
   at least one interior transceiver;
   at least one exterior transceiver; and
   a key device,
   wherein time-of-flight measurements are carried out using the at least one interior transceiver arranged in an interior of the transportation vehicle and the at least one exterior transceiver arranged outside the interior;
   wherein a position of the key device is determined relative to the transportation vehicle by the control unit based on the time-of-flight measurements, wherein the determination of the key device position is performed in an interior locating operation in which the position of the key device relative to the transportation vehicle is determined based only on the time-of-flight measurement with the at least one interior transceiver, wherein the determination of the key position relative to the transportation vehicle is performed in an exterior locating operation in which the relative position is determined based only on the time-of-flight measurement with the at least one exterior transceiver, and wherein the interior locating operation and the exterior locating operation are carried out separately;
   wherein an operating function of the locking system is performed by the control unit based on the determined position of the key device relative to the transportation vehicle, wherein the relative position determined during the interior location operation and/or the exterior location operation is selected as the basis for performing the locking system operating function to be performed, wherein the locking system operating function is a locking of the transportation vehicle, an unlocking of the transportation vehicle and/or a starting of a drive motor of the transportation vehicle; and
   wherein the time-of-flight measurements carried out during the interior location operation and/or the time-of-flight measurements carried out during the exterior location operation are validated, wherein a verification is performed during the validation to determine whether a signal from the at least one interior transceiver and/or the at least one exterior transceiver has been is reflected during the time-of-flight measurement.

10. A transportation vehicle having the locking system of claim 9.

11. The locking system of claim 9, wherein, in response to the operating function being the locking of the transportation vehicle, the locking is performed based only on the relative position determined during the interior location operation.

12. The locking system of claim 9, wherein, in response to the operating function being the unlocking of the transportation vehicle, the unlocking is performed based only on the relative position determined during the exterior location operation.

13. The locking system of claim 9, wherein, in response to the operating function being the starting of the drive motor of the transportation vehicle, the relative position determined during the interior location operation is verified by the relative position determined during the exterior location operation.

14. The locking system of claim 9, wherein a prioritization of the relative position determined during the interior location operation and/or the exterior location operation is performed based on the locking system operating function to be performed.

15. The locking system of claim 9, wherein the interior location operation and the exterior location operation are performed continuously and the method further comprises storing the determined relative positions.

16. The locking system of claim 9, wherein the interior location operation and the exterior location operation are performed in parallel.

17. The locking system of claim 9, further comprising categorizing a surrounding area of the transportation vehicle based on reference measurements and a measurement using the at least one exterior transceiver.

* * * * *